United States Patent
DeCook et al.

(10) Patent No.: US 10,422,667 B2
(45) Date of Patent: Sep. 24, 2019

(54) THREE POINT MOUNT FOR A VIBRATION SENSING APPARATUS

(71) Applicant: ITT MANUFACTURING ENTERPRISES LLC, Wilmington, DE (US)

(72) Inventors: Bradley DeCook, Victor, NY (US); Mark Playford, Liverpool, NY (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 157 days.

(21) Appl. No.: 15/483,302

(22) Filed: Apr. 10, 2017

(65) Prior Publication Data

US 2018/0292243 A1    Oct. 11, 2018

(51) Int. Cl.
| | | |
|---|---|---|
| *G08B 5/22* | (2006.01) | |
| *G01D 11/30* | (2006.01) | |
| *G01D 11/24* | (2006.01) | |
| *G01H 1/00* | (2006.01) | |
| *F04B 51/00* | (2006.01) | |

(52) U.S. Cl.
CPC ......... *G01D 11/305* (2013.01); *G01D 11/245* (2013.01); *G01H 1/00* (2013.01); *F04B 51/00* (2013.01)

(58) Field of Classification Search
CPC ..... G01D 11/305; G01D 11/245; F04B 51/00; G08B 5/36; G01H 1/003; G01H 1/00; G01H 1/06; G01P 15/097; G01P 15/10; G91D 11/305
See application file for complete search history.

(56) References Cited

U.S. PATENT DOCUMENTS

| | | |
|---|---|---|
| D202,145 S | 8/1965 | Schroeder et al. |
| D303,670 S | 9/1989 | Adolfo |
| D327,272 S | 6/1992 | Cadotte et al. |
| D329,197 S | 9/1992 | Tibbs |
| 5,150,568 A | 9/1992 | White |
| D344,028 S | 2/1994 | Byar |
| D349,710 S | 8/1994 | Moro |
| D398,820 S | 9/1998 | Cougar |
| D408,266 S | 4/1999 | Santiago |
| D410,855 S | 6/1999 | Gordon |
| D447,148 S | 8/2001 | Antony et al. |

(Continued)

FOREIGN PATENT DOCUMENTS

| | | |
|---|---|---|
| GB | 1319055 | 5/1973 |
| WO | 03040780 | 5/2003 |

*Primary Examiner* — Harshad R Patel
*Assistant Examiner* — Nigel H Plumb
(74) *Attorney, Agent, or Firm* — Morritt Hock & Hamroff LLP; Bret P. Shapiro (57) ABSTRACT

A sensing module apparatus is provided for monitoring a vibrating machine or structure, such as a pump, which include three mounting points on the apparatus for securely mounting the apparatus to the vibrating machine or structure. The three-point mount configuration provides the sensor module with a very rigid mount connection to virtually any surface condition, including flat, curved or irregular. All six degrees of freedom (X, Y, Z, theta-X, theta-Y and theta-Z) are properly constrained. The three-point mount also provides an air barrier or gap between the sensing module and the equipment surface, allowing the sensor to be mounted to higher surface temperature devices.

17 Claims, 5 Drawing Sheets

(56) References Cited

U.S. PATENT DOCUMENTS

| | | | |
|---|---|---|---|
| D460,699 S | 7/2002 | Amborn et al. | |
| D460,922 S | 7/2002 | Amborn et al. | |
| 6,598,479 B1* | 7/2003 | Robinson | G01H 11/06 73/658 |
| 6,941,785 B2 | 9/2005 | Haynes et al. | |
| D533,547 S | 12/2006 | Sergi | |
| D549,250 S | 8/2007 | Salomaa et al. | |
| D549,254 S | 8/2007 | Salomaa et al. | |
| D549,737 S | 8/2007 | Chu | |
| D562,849 S | 2/2008 | Buitenhuis et al. | |
| D566,648 S | 4/2008 | Lee | |
| D586,670 S | 2/2009 | Playford et al. | |
| 8,123,182 B2 | 2/2012 | Sonntag et al. | |
| 8,777,174 B2 | 7/2014 | Hynell | |
| D747,225 S | 1/2016 | DeCook et al. | |
| 9,811,984 B2* | 11/2017 | Decook | G08B 5/36 |
| 2003/0063826 A1 | 4/2003 | Cevasco et al. | |
| 2015/0355216 A1* | 12/2015 | Girardeau | G01H 11/08 73/514.29 |
| 2016/0300459 A1 | 10/2016 | DeCook et al. | |

* cited by examiner

FIG. 1A

PRIOR ART

THREE POINT MOUNT FOR A VIBRATION SENSING APPARATUS

BACKGROUND OF THE INVENTION

1. Field of the Invention

This application relates to a sensing module device for use in combination with a vibrating machine or structure that is configured to be securely mounted to the vibrating machine or structure.

2. Brief Description of Related Art

The present invention relates to an apparatus for monitoring a vibrating machine or structure, such as a pump or pump assembly. By way of example, such an apparatus may take form of a sensing module for configuring on the vibrating machine or structure, such as the pump or pump assembly. The sensing module may include an outer shell configured with a recessed portion, and a base having encapsulated electronics. An example of such a sensing module is shown and described in applicant's U.S. application Ser. No. 14/685,134 filed on Apr. 13, 2015, which is incorporated by reference in its entirety.

Figure 1A:
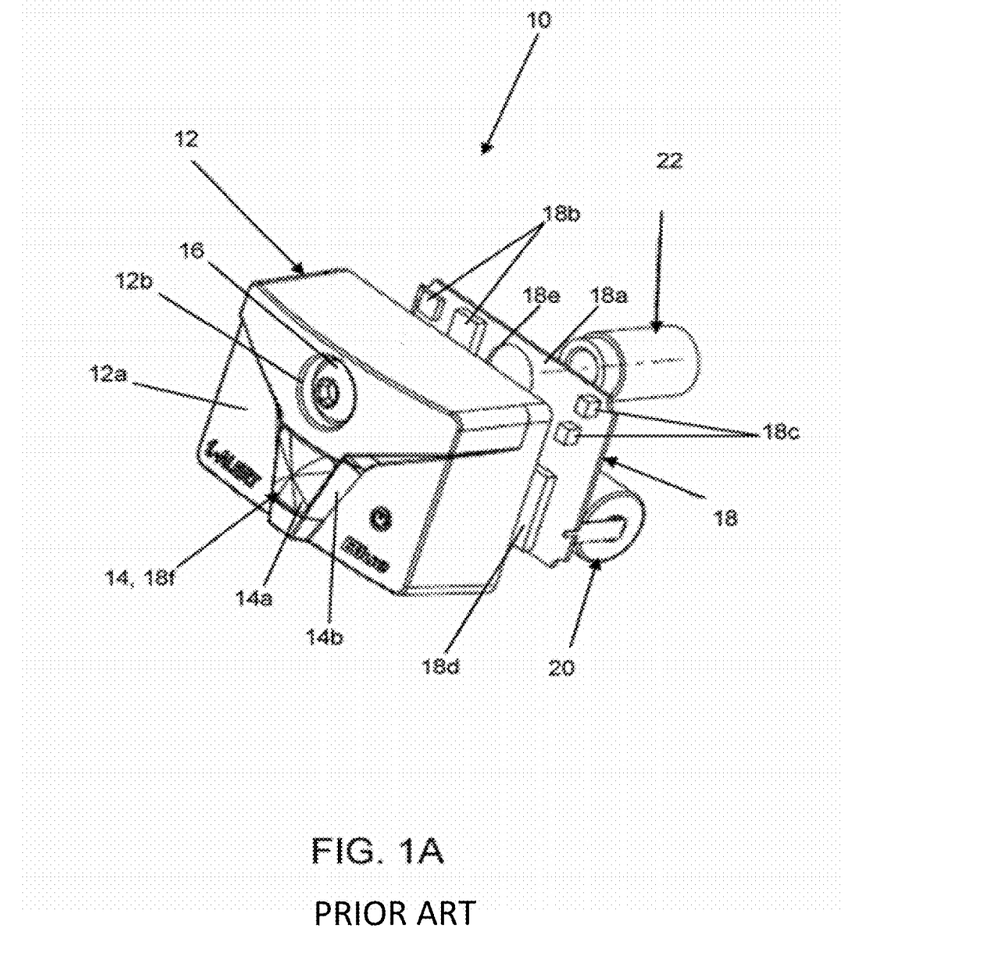
FIG. 1A is an exploded view of a sensing module, according to some embodiments of the present invention.
Figure 1B:
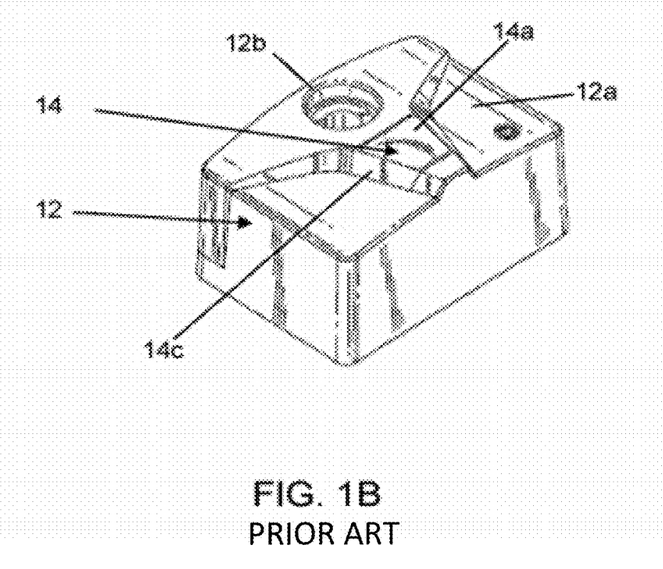
FIG. 1B is a top perspective view of an outer shell of a sensing module, according to some embodiments of the present invention.
Figure 1C:
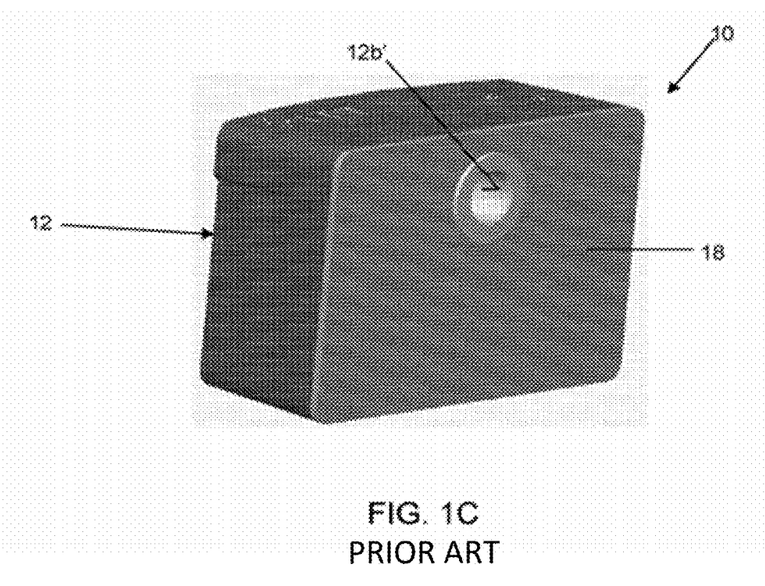
FIG. 1C is a bottom perspective view of an outer shell of a sensing module, according to some embodiments of the present invention.

By way of example, FIGS. 1A-1C show apparatus 10 in the form of a sensing module for configuring on a vibrating machine or structure, such as pump or pump assembly 100. The sensing module 10 may include an outer shell 12 having a top surface 12a with a recessed portion in combination with a base 18, e.g., which may take the form of a printed circuit board 18a, having encapsulated electronics, e.g., such as elements 18b, 18c, 18d and 18f. The recessed portion is configured as, or formed with, an opening therein. The outer shell 12 also includes a circular rim 12b that is configured to form a mounting opening 12b' for receiving the mounting screw or fastener 16 to fasten the sensing module 10 to the vibrating machine or structure, such as the pump or pump assembly 100.

The encapsulated electronics 18b, 18c, 18d and 18f includes a multicolored light array 18f (e.g., in the form of an LED array) that is arranged inside the outer shell 12, and configured to respond to signaling containing information about a condition being sensed and monitored by the sensing module 10 and provide along a projection axis at least one beam of light containing information about the condition. By way of example, the signaling may be received from one or more of the other encapsulated electronics 18b, 18c, 18d, e.g., which may include an accelerometer, a temperature sensing device or other suitable sensing device that is either now known or later developed in the future.

The sensing module 10 also includes a domed lens 14 configured in the recessed portion of the outer shell 12, that is configured to reflect, re-reflect and project the at least one beam of light outwardly in relation to the projection axis with a visibility of 360° about the sensing module 10 for viewing from afar, e.g., by an observer visually monitoring the sensing module 10. The domed lens 14 may include a middle lens portion 14a configured with a top curved surface and two side lens portions 14b, 14c configured with side surfaces. The middle lens portion 14a and two side lens portions 14b, 14c are transparent to project the at least one beam of light from the domed lens 14. The top curved surface may be configured with a suitable curvature for projecting, reflecting and re-reflecting the at least one beam of light.

In effect, the visibility of the at least one beam of light being reflected, re-reflected and projected from the domed lens 14 may be defined visually either as being 360° in relation to a horizontal plane or as being 180° in relation to a vertical plane, when viewed by an observer in an industrial plant monitoring the vibrating machine or structure from a distance. In either case, the observer in the industrial plant monitoring the vibrating machine or structure may able to see the at least one beam of light being projected from the domed lens 14 from afar, e.g., with a glow of projected light.

In FIG. 1A-1C, the sensing module 10 is shown to include a mounting screw or fastener 16, a power source 20, such as a lithium ion battery, as well as a stand-off mount 22 for configuring the sensing module 10 on the vibrating machine or structure, such as the pump or pump assembly 100. A clearance hole 18e may be formed in the base 18 for receiving the stand-off mount 22.

However, a shortcoming of the above-described sensing module 10 is that it is fastened to the pump 100 or other equipment in a manner wherein the sensor module 10 may not be rigidly mounted to the pump 100 or other equipment in all six degrees of freedom. Typical mounting scenarios may include a flat surface against a flat surface, a flat surface against a curved surface or V-rails against a curved surface.

The sensing module 10 may be attached to the pump 100 or other equipment in an over-constrained or under-constrained manner.

Figure 1D:
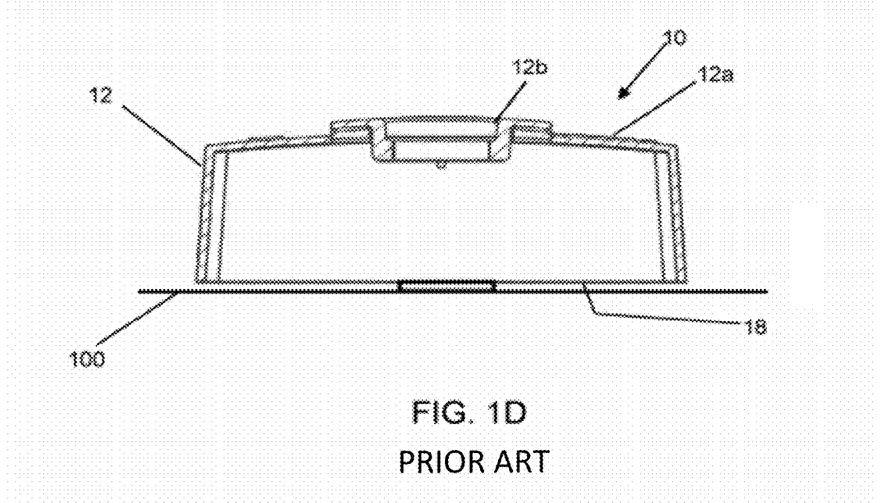
FIG. 1D is a cross-sectional view of a sensing module mounted to a pump in an under-constrained manner.

FIG. 1D shows an example of an under-constrained design. A gap between the flat base 18 of the sensing module 10 and the pump 100, caused by a rim projecting from the base 18, produces additional resonances, which degrade vibration measurement accuracy.

Figure 1E:
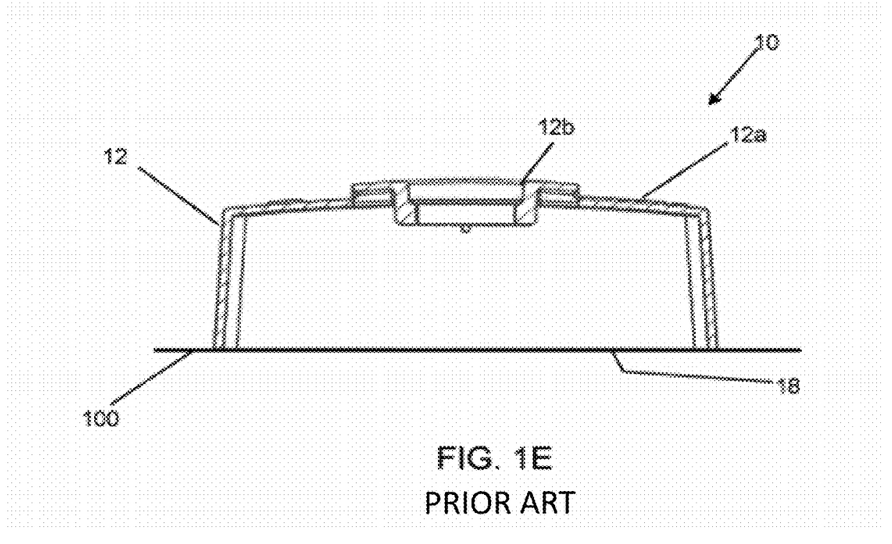
FIG. 1E is a cross-sectional view of a sensing module mounted to a pump in an over-constrained manner.

FIG. 1E shows an example of an over-constraint design. Multiple mounting contacts are made between the base 18 of the sensing module and the pump 100, which also produces additional resonances degrading vibration measurement accuracy. An additional example of such a design can be found in applicant's U.S. Design Pat. No. D747,225. The mounting bracket shown therein includes a nub, which provides a single point contact, and an edge, which provides a "line" with multiple points of contact.

SUMMARY OF THE INVENTION

The present invention provides a new and unique apparatus for monitoring a vibrating machine or structure, such as a pump or pump assembly, having three mounting points on the apparatus for securely mounting the apparatus to the pump or pump assembly.

The present invention increases the overall natural frequency of the apparatus' mounting to the vibrating machine, resulting in more accurate higher frequency measurement over a larger frequency band.

The shortcomings of the art described above are overcome by providing an exact constraint method of utilizing a built-in three-point mount configuration. The three-point mount configuration provides the sensor module with a very rigid mount connection to virtually any surface condition, including flat, curved or irregular. All six degrees of freedom (X, Y, Z, theta-X, theta-Y and theta-Z) are properly constrained with this design approach, providing the best connection to the piece of equipment for vibration sensing and analysis.

The three-point mount also provides an air barrier or gap between the sensing module and the equipment surface, allowing the sensor to be mounted to devices having a high surface temperature. The air gap acts as a thermal insulator for the sensor module, which can prevent premature sensor failure. This allows the sensor to be mounted onto hot running equipment, and in harsher environments.

By way of example, the apparatus may take the form of a sensing module for configuring on the vibrating machine or structure, such as the pump or pump assembly.

In accordance with a first aspect of the invention, a sensing module for configuring on a vibrating machine or structure, including a pump, is provided. The sensing module comprises a base comprising three mounting points configured to mount the sensing module to the vibrating machine or structure. The three mounting points comprise a first mounting projection providing a first mounting point, a second mounting projection providing a second mounting point, and a third mounting projection providing a third mounting point and comprising a rim surrounding an opening, wherein the opening is formed through a body of the sensing module and is configured to receive a fastener configured to secure the sensing module to the vibrating machine or structure.

Further in accordance with the first aspect of the invention, the first, second and third mounting projections are configured to constrain movement the sensing module in six degrees of freedom when the sensing module is mounted to the vibrating machine or structure.

In accordance with one or more embodiments of the sensing module of first aspect of the invention, the first, second and third mounting projections are configured to form an air gap between the sensing module and the vibrating machine or structure when the sensing module is mounted to the vibrating machine or structure.

Further in accordance with one or more embodiments of the sensing module of first aspect of the invention, the first mounting projection and the second mounting projection are rounded projections extending from the base.

Further in accordance with one or more embodiments of the sensing module of first aspect of the invention, the first mounting projection and second mounting projection have substantially the same diameter. The first mounting projection and second mounting projection may also have substantially the same height projecting from the base.

Further in accordance with one or more embodiments of the sensing module of first aspect of the invention, the base of the sensing module is substantially rectangular is shape, and the first and second mounting projections are positioned in separate corners of the base. In one such embodiment, the first and second mounting projections are positioned in separate corners along a same edge of the base, and the third mounting projection may be positioned in a location on the base of the sensing module so as to form a triangular set of mounting projections on the base of the sensing module.

Further in accordance with one or more embodiments of the sensing module of first aspect of the invention, the first mounting projection, second mounting projection and third mounting projection are positioned on the base of the sensing module so as to form a set of mounting points on the base of the sensing module arranged in a triangle. The first mounting projection and the second mounting projection are positioned at extremities of the base of the sensing module. The first mounting projection and the second mounting projection may also be separated by approximately 120 degrees. The third mounting projection can be positioned at a centroid of the triangle formed by the first mounting projection, second mounting projection and third mounting projection.

Further in accordance with one or more embodiments of the sensing module of first aspect of the invention, the first mounting projection and the second mounting projection are hemispherical projections extending from the base.

Further in accordance with one or more embodiments of the sensing module of first aspect of the invention, the first mounting projection and the second mounting projection are molded into the base.

Further in accordance with one or more embodiments of the sensing module of first aspect of the invention, the first mounting projection and the second mounting projection are secured to the base with a press fit, threading or an industrial adhesive.

Further in accordance with one or more embodiments of the sensing module of first aspect of the invention, the base comprises one or more cavities formed therein.

BRIEF DESCRIPTION OF THE DRAWING

The drawing includes the following Figures, which are not necessarily drawing to scale.

DETAILED DESCRIPTION OF THE INVENTION

The present invention will now be described with reference made to FIGS. 2A-2D.

Figure 2A:
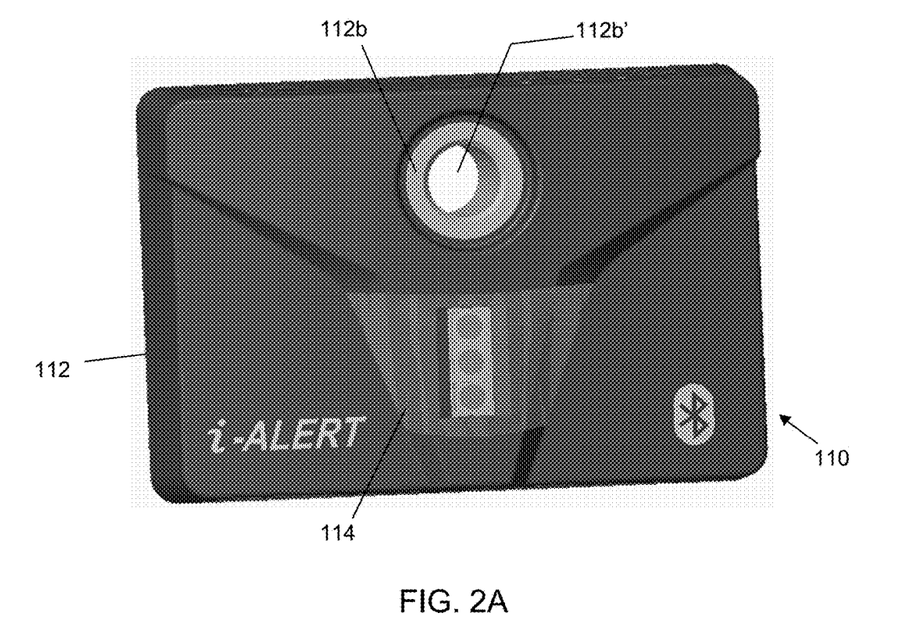
FIG. 2A is a top perspective view of a sensing module according to a first embodiment of the present invention.
Figure 2B:
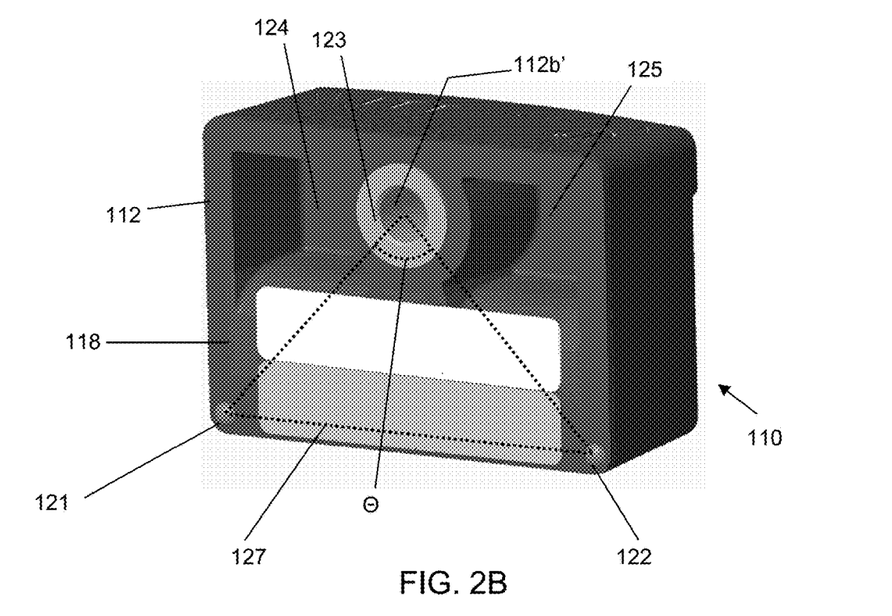
FIG. 2B is a bottom perspective view of a sensing module according to the first embodiment of the present invention.

By way of example, FIGS. 2A-2B show an apparatus 110 in the form of a sensing module for configuring on a vibrating machine or structure, such as pump or pump assembly 200. The sensing module 110 may include an outer shell 112 having a top surface 112a and a base 118, and encapsulated electronics. The encapsulated electronics may include, for example, a multicolored light array in the form of an LED array that is arranged inside the outer shell 112, and configured to respond to signaling containing information about a condition being sensed and monitored by the sensing module 110 and at least one beam of light containing information about the condition. By way of example, the signaling may be received from one or more of the other encapsulated electronics, which may include an accelerometer, a temperature sensing device or other suitable sensing device that is either now known or later developed in the future. The sensing module 110 may also include a domed lens 114 configured on the outer shell 112, that is configured to reflect, re-reflect and project the at least one beam of light outwardly with a visibility of 360° about the sensing module 110 for viewing from afar, e.g., by an observer visually monitoring the sensing module 110. As a result, an observer in an industrial plant monitoring the vibrating machine or structure may able to see the at least one beam of light being projected from the domed lens 114 from afar, e.g., with a glow of projected light. The outer shell 112 may also include a circular rim 112b that is configured to form a mounting opening 112b' for receiving a mounting screw or fastener to fasten the sensing module 110 to the vibrating machine or structure, such as the pump or pump assembly 200.

The sensing module 110 may operate and function in the same manner as the sensing module 10 of FIG. 1A-1C described above and as described in U.S. application Ser. No. 14/685,134 filed on Apr. 13, 2015, which is incorporated by reference in its entirety.

Figure 2C:
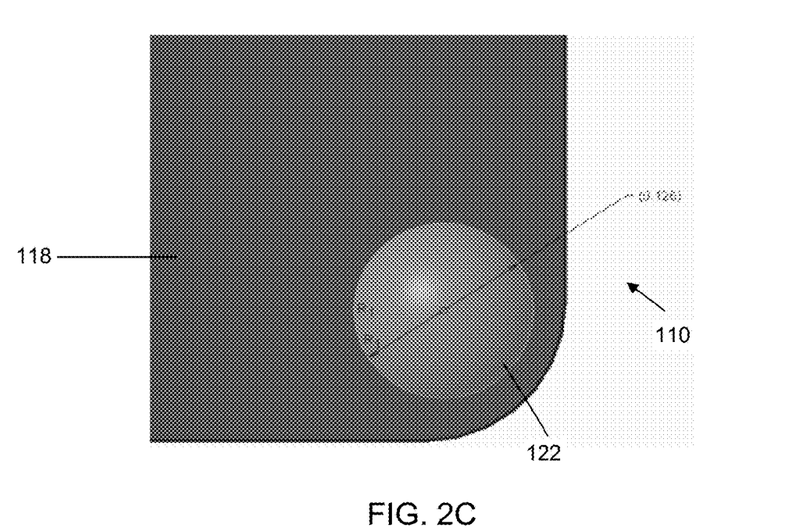
FIG. 2C is view of a mounting projection on the base of a sensing module according to the first embodiment of the present invention.
Figure 2D:
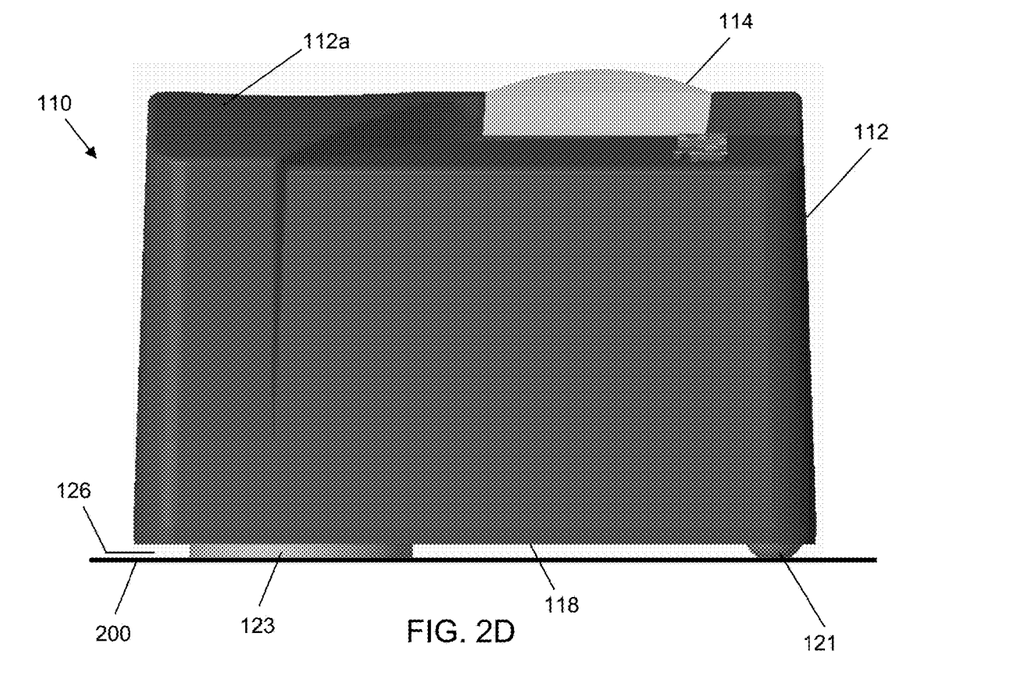
FIG. 2D is a side view of a sensing module according to the first embodiment of the present invention mounted to a pump.

The sensing module 110 includes a unique mounting arrangement on the base 118 for mounting the sensing module 110 to a vibrating machine or structure, such as a pump 200, as shown for example in FIGS. 2B-2D. The base 118 comprises three mounting points in the form of three mounting projections 121, 122, 123.

The base 118 of the sensing module 110 may include a first mounting projection 121 and a second mounting projection 122, which project from the base 118. The first mounting projection 121 and the second mounting projection 122 may be hemispherical in shape and may be substantially similar in size. In a preferred embodiment, the first and second mounting projections comprise a rounded shape, in order to create a true point contact to the mating surface, although other shapes may be utilized that create a contact point for the mating surface. In the embodiment shown in the Figures, in which the base 118 is substantially rectangular in shape, the first mounting projection 121 and second mounting projection 122 are positioned in separate corners or extremities of the base 118. In a preferred embodiment, the first mounting projection 121 and second mounting projection 122 are separated by an angle Θ of approximately 120 degrees. The first mounting projection 121 and second mounting projection 122 can be molded into the sensing module 110 as part of the base 118. This may be done for ease of manufacturability and cost. In alternative embodiments, the first mounting projection 121 and/or second mounting projection 122 could also be separate parts that are secured in place to the base 118 via press-fit, threaded, industrial adhesive, or other attachment means.

The base 118 also includes a third mounting projection 123 in the form of a rim that surrounds the opening 112b' through the sensing module 110. The opening 112b' is configured to receive a fastener, such as a bolt or a screw, which may be received in a corresponding opening on the pump 200. The third mounting projection 123 may come into contact with the pump 200, as shown in FIG. 2D, separating the base 118 of the sensing module 110 from the surface of the pump 200.

A force is applied to pre-load the sensing module 110 against its mount surface, such as the pump 200. The screw fastener (not shown) is provided for this purpose. The pre-load or mounting force lies within the triangle (represented by dashed lines 127 shown in FIG. 2B) formed by the three points of contact 121, 122, 123, preferably at the centroid of the triangle 127.

When the sensing module 110 is secured to the pump 200, an air gap 126 is formed between the base 118 of the sensing module 110 and the surface of the pump 200 as a result of the three mounting points. The air gap 126 provides a thermal barrier between the sensing module 110 and the pump 200, which allows the sensing module 110 to function in high-temperature environments.

As shown for example in FIG. 2B, one or more cavities 124, 125 may also be formed in the base 118 of the sensing module 110. The cavities 124, 125 reduce the thickness of the base 118 of the sensing module 110, which may be injection molded. Additionally, reducing the weight of the module without reducing its structural strength results in a higher natural frequency of the sensing module 110, and this can be achieved by incorporating cavities 124, 125 in the base 118.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

We claim:

1. A sensing apparatus for mounting on a vibrating machine or structure, including a pump, comprising:
a base comprising three mounting points configured to mount the sensing apparatus to the vibrating machine or structure, wherein the three mounting points comprise:
a first mounting projection providing a first mounting point;
a second mounting projection providing a second mounting point; and
a third mounting projection providing a third mounting point, wherein the third mounting projection protrudes out from the base of the sensing apparatus and the third mounting projection comprises a rim surrounding an opening, wherein the opening is formed through a body of the sensing apparatus and the opening is configured to receive a fastener configured to secure the sensing apparatus to the vibrating machine or structure.

2. The sensing apparatus of claim 1, wherein the first, second and third mounting projections are configured to constrain movement of the sensing apparatus in six degrees of freedom when the sensing apparatus is mounted to the vibrating machine or structure.

3. The sensing apparatus of claim 1, wherein the first, second and third mounting projections are configured to form an air gap between the sensing apparatus and the vibrating machine or structure when the sensing apparatus is mounted to the vibrating machine or structure.

4. The sensing apparatus of claim 1, wherein the first mounting projection and the second mounting projection are rounded projections extending from the base.

5. The sensing apparatus of claim 4, wherein the first mounting projection and second mounting projection have the same diameter.

6. The sensing apparatus of claim 4, wherein the first mounting projection and second mounting projection have the same height.

7. The sensing apparatus of claim 1, wherein the base of the sensing apparatus is rectangular in shape, and the first and second mounting projections are positioned in separate corners of the base.

8. The sensing apparatus of claim 7, wherein the first and second mounting projections are positioned in separate corners along a same edge of the base.

9. The sensing apparatus of claim 8, wherein the third mounting projection is positioned in a location on the base of the sensing apparatus so as to form a triangular set of mounting projections on the base of the sensing apparatus.

10. The sensing apparatus of claim 1, wherein the first mounting projection, second mounting projection and third mounting projection are positioned on the base of the sensing apparatus so as to form a set of mounting points on the base of the sensing apparatus arranged in a triangle.

11. The sensing apparatus of claim 10, wherein the first mounting projection and the second mounting projection are positioned at extremities of the base of the sensing apparatus.

12. The sensing apparatus of claim 11, wherein the triangle includes an angle at the third mounting position of approximately 120 degrees.

13. The sensing apparatus of claim 12, wherein a pre-load force is positioned at a centroid of the triangle formed by the first mounting projection, second mounting projection and third mounting projection.

14. The sensing apparatus of claim 1, wherein the first mounting projection and the second mounting projection are hemispherical projections extending from the base.

15. The sensing apparatus of claim 1, wherein the first mounting projection and the second mounting projection are molded into the base.

16. The sensing apparatus of claim 1, wherein the first mounting projection and the second mounting projection are secured to the base with a press fit, threading or an industrial adhesive.

17. The sensing apparatus of claim 1, wherein the base comprises one or more cavities formed therein.

* * * * *